United States Patent
Si et al.

(10) Patent No.: US 12,284,131 B2
(45) Date of Patent: Apr. 22, 2025

(54) METHOD FOR REPORTING POSITIONING MEASUREMENT INFORMATION, TERMINAL, AND NETWORK DEVICE

(71) Applicant: VIVO MOBILE COMMUNICATION CO., LTD., Guangdong (CN)

(72) Inventors: Ye Si, Chang'an Dongguan (CN); Peng Sun, Chang'an Dongguan (CN); Huaming Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 395 days.

(21) Appl. No.: 17/485,075

(22) Filed: Sep. 24, 2021

(65) Prior Publication Data
US 2022/0014335 A1    Jan. 13, 2022

Related U.S. Application Data

(63) Continuation of application No. PCT/CN2019/129240, filed on Dec. 27, 2019.

(30) Foreign Application Priority Data

Mar. 26, 2019  (CN) .......................... 201910234824.8

(51) Int. Cl.
| | | |
|---|---|---|
| H04L 5/00 | (2006.01) | |
| G01S 13/87 | (2006.01) | |
| H04B 17/318 | (2015.01) | |

(52) U.S. Cl.
CPC .......... *H04L 5/0053* (2013.01); *G01S 13/878* (2013.01); *H04B 17/318* (2015.01)

(58) Field of Classification Search
CPC ... H04L 5/0053; H04L 5/0023; H04L 5/0048; G01S 13/878; G01S 5/0205; G01S 1/08;
(Continued)

(56) References Cited

U.S. PATENT DOCUMENTS

| 11,546,845 B2* | 1/2023 | Jung | ..................... H04W 68/02 |
| 2014/0349582 A1* | 11/2014 | Xiao | ........................ G01S 5/10 455/67.11 |

(Continued)

FOREIGN PATENT DOCUMENTS

| CN | 101459930 A | 6/2009 |
| CN | 105850055 A | 8/2016 |

(Continued)

OTHER PUBLICATIONS

European Search Report dated Apr. 8, 2022 as received in application No. 19921618.5.

(Continued)

*Primary Examiner* — Yuwen Pan
*Assistant Examiner* — Swati Jain
(74) *Attorney, Agent, or Firm* — BROOKS KUSHMAN P.C.

(57) ABSTRACT

A method for reporting positioning measurement information, a terminal, and a network device are provided. The method includes: receiving first configuration information from a network device; and reporting a measurement result of a beam group based on the first configuration information, where the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

17 Claims, 3 Drawing Sheets

(58) Field of Classification Search
CPC ... G01S 5/0268; G01S 5/0009; H04B 17/318; H04B 17/27; H04B 7/0695; H04W 24/10; H04W 64/00; H04W 16/28; H04W 72/23

See application file for complete search history.

(56) References Cited

U.S. PATENT DOCUMENTS

| | | | | |
|---|---|---|---|---|
| 2015/0188678 | A1* | 7/2015 | Wu | G01S 1/14 |
| | | | | 455/456.6 |
| 2018/0007576 | A1* | 1/2018 | Lee | H04L 5/0035 |
| 2018/0049149 | A1* | 2/2018 | Lee | H04W 64/00 |
| 2018/0324738 | A1* | 11/2018 | Stirling-Gallacher | H04B 7/04 |
| 2019/0223140 | A1* | 7/2019 | Grossmann | G01S 5/02585 |
| 2019/0380056 | A1* | 12/2019 | Lee | H04B 7/0695 |
| 2020/0014454 | A1* | 1/2020 | Guo | H04B 7/0408 |
| 2020/0067590 | A1* | 2/2020 | Wang | H04B 7/0868 |
| 2020/0068462 | A1* | 2/2020 | Zetterberg | H04W 16/28 |
| 2020/0128421 | A1 | 4/2020 | Yang et al. | |
| 2020/0142025 | A1* | 5/2020 | Irvine | H01Q 3/36 |
| 2020/0145977 | A1* | 5/2020 | Kumar | H04W 56/001 |
| 2020/0229130 | A1* | 7/2020 | Keating | H04W 52/0229 |
| 2020/0267684 | A1* | 8/2020 | Huang | H04L 5/0051 |
| 2020/0367223 | A1* | 11/2020 | Cheng | H04W 72/046 |
| 2021/0006372 | A1* | 1/2021 | Cha | G01S 5/0205 |
| 2021/0176738 | A1* | 6/2021 | Ye | H04W 72/23 |
| 2021/0195451 | A1* | 6/2021 | Da Silva | H04W 36/0085 |
| 2021/0282106 | A1* | 9/2021 | Xiong | H04W 64/00 |
| 2021/0306895 | A1* | 9/2021 | Chen | G01S 5/0236 |
| 2021/0345289 | A1* | 11/2021 | Priyanto | H04L 5/0048 |
| 2021/0368468 | A1* | 11/2021 | Xing | H04W 64/00 |
| 2022/0116089 | A1* | 4/2022 | Khoryaev | H04W 64/00 |
| 2022/0116129 | A1* | 4/2022 | Ying | H04B 17/345 |
| 2022/0123847 | A1* | 4/2022 | Ghozlan | H04B 17/318 |
| 2022/0131676 | A1* | 4/2022 | Zhang | H04L 5/005 |
| 2022/0132349 | A1* | 4/2022 | Li | H04B 7/0417 |
| 2023/0121925 | A1* | 4/2023 | Da Silva | H04W 72/0453 |
| | | | | 370/329 |
| 2023/0224059 | A1* | 7/2023 | Parkvall | H04L 5/0053 |
| | | | | 370/321 |
| 2023/0224751 | A1* | 7/2023 | Da Silva | H04L 1/0026 |
| | | | | 370/252 |
| 2023/0232389 | A1* | 7/2023 | Shao | H04L 5/0053 |
| | | | | 370/329 |
| 2023/0276257 | A1* | 8/2023 | Franke | H04W 72/23 |
| | | | | 375/262 |
| 2023/0412336 | A1* | 12/2023 | Cha | H04W 72/51 |
| 2024/0023059 | A1* | 1/2024 | Edge | H04B 7/0452 |
| 2024/0080905 | A1* | 3/2024 | Deng | H04L 27/2607 |

FOREIGN PATENT DOCUMENTS

| | | | | |
|---|---|---|---|---|
| CN | 108260133 | A | | 7/2018 |
| EP | 3879881 | A1 * | 9/2021 | ......... H04B 7/0617 |
| EP | 3963971 | | | 3/2022 |
| WO | 2019027595 | A1 | | 2/2019 |
| WO | 2018159967 | A1 | | 9/2019 |

OTHER PUBLICATIONS

"NR beam management supporting multi-gNB measurements for positioning" 3GPP TSG RAN WG1 Meeting #95, R1-1813583, Nov. 12, 2018. Fraunhofer IIS, Fraunhofer HHI.

Japanese Office Action dated Nov. 29, 2022 as received in application No. 2021-557120.

3GPP TSG RAN WG1 Ad-Hoc Meeting 1901, R1-1900629, Jan. 21, 2019. "Discussions on DL only based positioning" LG Electronics.

International Search Report and Written Opinion dated Oct. 7, 2021 as received in application No. PCT/CN2019/129240.

* cited by examiner

METHOD FOR REPORTING POSITIONING MEASUREMENT INFORMATION, TERMINAL, AND NETWORK DEVICE

CROSS-REFERENCE TO RELATED APPLICATIONS

This application is continuation application of PCT International Application No. PCT/CN2019/129240 filed on Dec. 27, 2019, which claims priority to Chinese Patent Application No. 201910234824.8 filed in China on Mar. 26, 2019, which are incorporated in their entireties by reference herein.

TECHNICAL FIELD

This disclosure relates to the field of communications technologies, and in particular, to a method for reporting positioning measurement information, a terminal, and a network device.

BACKGROUND

In a long term evolution (LTE) system, a positioning reference signal (PRS) is a reference signal (RS) used for downlink positioning. A terminal (User Equipment, UE) measures PRSs sent from a plurality of cells or a plurality of transmission points (TP), and obtains a reference signal time difference (RSTD) between the plurality of cells or transmission points. Then the UE sends RSTD information obtained through measurement to a location server, and the location server obtains a location of the UE through calculation.

In a downlink positioning method, the UE does not obtain precise time of arrival (TOA), and an estimated location is determined by time differences of arrival (TDOA) (represented by time difference of reference signal (RSTD) in a standard) of at least three base stations, that is, determined by relative time rather than absolute time. In principle, two base stations participating in positioning can determine one hyperbolic trajectory of the UE, and three base stations participating in positioning can define the UE within a very small area. One more base station added may define the UE within another area, and a location range of the UE may be narrowed by using an overlapping part. In downlink positioning in LTE, the UE needs to measure PRSs from a plurality of base stations or a plurality of cells to obtain RSTDs, and then report RSTD information to a location server on a network side. Finally, the location server calculates the location of the UE.

Considering that in a new radio (NR) system, a PRS is sent in a serving cell or a neighboring cell by beam sweeping, the UE may need to measure PRSs of multiple beams from the serving cell or the neighboring cell during positioning. Reporting of multi-beam measurement results causes a great increase of complexity and overheads. In a case of multiple beams, how to properly report multi-beam measurement results has not been clearly defined, and needs to be resolved urgently.

SUMMARY

Embodiments of this disclosure provide a method for reporting positioning measurement information, a terminal, and a network device to resolve a problem of reporting multi-beam measurement results.

According to a first aspect, an embodiment of this disclosure provides a method for reporting positioning measurement information, applied to a terminal and including:
receiving first configuration information from a network device; and
reporting a measurement result of a beam group based on the first configuration information, where
the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

According to a second aspect, an embodiment of this disclosure further provides a method for reporting positioning measurement information, applied to a network device and including:
sending first configuration information to a terminal; and
receiving a measurement result of a beam group from the terminal, where
the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

According to a third aspect, an embodiment of this disclosure further provides a terminal, including:
a first receiving module, configured to receive first configuration information from a network device; and
a first sending module, configured to report a measurement result of a beam group based on the first configuration information, where
the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

According to a fourth aspect, an embodiment of this disclosure further provides a network device, including:
a second sending module, configured to send first configuration information to a terminal; and
a second receiving module, configured to receive a measurement result of a beam group from the terminal, where
the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

According to a fifth aspect, an embodiment of this disclosure further provides a terminal, including a memory, a processor, and a program stored in the memory and capable of running on the processor, where when the program is executed by the processor, steps of the foregoing method for reporting positioning measurement information are implemented.

According to a sixth aspect, an embodiment of this disclosure further provides a network device, including a memory, a processor, and a program stored in the memory and capable of running on the processor, where when the program is executed by the processor, steps of the foregoing method for reporting positioning measurement information are implemented.

According to a seventh aspect, an embodiment of this disclosure further provides a computer-readable storage medium, where the computer-readable storage medium stores a computer program, and when the computer program is executed by a processor, steps of the method for reporting positioning measurement information on a terminal side are implemented, or when the computer program is executed by a processor, steps of the method for reporting positioning measurement information on a network device side are implemented.

In the embodiments of this disclosure, during reporting of positioning measurement information, RSRP or TOA may be used to determine measurement results of N beams for reporting, so that reporting of positioning measurement information is implemented when PRSs of multiple beams are received. Because the beam measurement results to be reported may be properly selected based on the RSRP and the TOA, overheads for reporting the positioning measurement information can be reduced.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains without creative efforts based on the embodiments of this disclosure shall fall within the protection scope of this disclosure.

In the specification and claims of this application, the term "include", and any other variant thereof mean to cover a non-exclusive inclusion. For example, a process, method, system, product, or device that includes a list of steps or units is not necessarily limited to those steps or units, but may include other steps or units not expressly listed or inherent to such a process, method, system, product, or device. In addition, the term "and/or" used in the specification and claims indicates at least one of connected objects. For example, "A and/or B" represents the following three cases: only A, only B, and both A and B.

In the embodiments of this disclosure, terms such as "an example" or "for example" are used to represent an example, an instance, or an illustration. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner.

The following describes the embodiments of this disclosure with reference to the accompanying drawings. A method for reporting positioning measurement information, a terminal, and a network device provided in the embodiments of this disclosure may be applied to a wireless communications system. The wireless communications system may be a 5G system, or an evolved long term evolution (eLTE) system, or a later evolved communications system.

Figure 1:
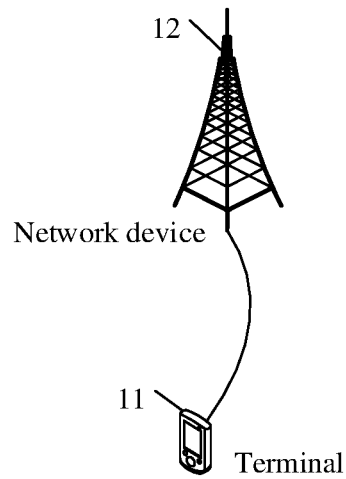
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and a network device 12. The terminal 11 may be a user terminal or another terminal-side device, for example, a mobile phone, a tablet computer, a laptop computer, a personal digital assistant (PDA), a mobile Internet device (MID), or a wearable device. It should be noted that a specific type of the terminal 11 is not limited in this embodiment of this disclosure. The network device 12 may be a 5G base station, or a base station of a later version, or a base station in another communications system, or is referred to as a NodeB, or an evolved NodeB, or a transmission and reception point (Transmission Reception Point, TRP), or an access point (AP), or other terms in the art. As long as a same technical effect is achieved, the network device is not limited to a specific technical term. In addition, the network device 12 may be a master node (MN) or a secondary node (SN). It should be noted that the 5G base station is used merely as an example in this embodiment of this disclosure, rather than limiting a specific type of the network device.

Figure 2:
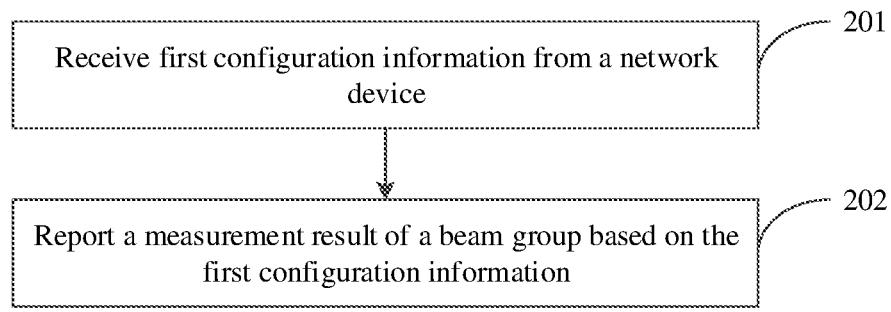
FIG. 2 is a flowchart of a method for reporting positioning measurement information according to an embodiment of this disclosure.

FIG. 2 is a flowchart of a method for reporting positioning measurement information according to an embodiment of this disclosure. The method is applied to a terminal. As shown in FIG. 2, the method includes the following steps.

Step 201: Receive first configuration information from a network device.

In this embodiment of this disclosure, the first configuration information is used to configure the terminal to report measurement results of beams in each cell participating in positioning. Specifically, the network device may transmit PRSs on different beams in each cell by beam sweeping, and the terminal measures the PRSs transmitted on all the beams to obtain beam measurement results. Specifically, a manner of sending the first configuration information may be set based on an actual requirement, and is not further limited herein. For example, in an optional embodiment, the first configuration information may be sent by using higher layer signaling.

Step 202: Report a measurement result of a beam group based on the first configuration information.

The beam group is used to transmit a positioning reference signal PRS, and the beam group includes N beams determined by reference signal received power (RSRP) or time of arrival TOA, where N is a positive integer, the N beams are beams in a first cell, and the first cell is one of cells participating in positioning.

It should be noted that in an optional embodiment, the beam group of the first cell may be determined based on RSRP; in another optional embodiment, the beam group of the first cell may be determined based on TOA; and in still another optional embodiment, the beam group of the first cell may be determined based on RSRP and TOA. For example, the N beams includes any one of the following:

top N beams in descending order of reference signal received power RSRP in the first cell;

all beams whose RSRP is higher than a preset threshold in the first cell;

top N beams selected from M beams in descending order of RSRP, where the M beams are beams whose RSRP is higher than the preset threshold in the first cell, and M is an integer greater than N;

top N beams in ascending order of TOA in the first cell;

top N beams selected from M beams in ascending order of TOA, where the M beams are beams whose RSRP is higher than a preset threshold in the first cell; and top L beams in ascending order of time of arrival TOA and top K beams in descending order of RSRP in the first cell, where N≤L+K.

It should be understood that when the manner of determining the N beams is top L beams in ascending order of time of arrival TOA and top K beams in descending order of RSRP in the first cell, the N beams are the top L beams and the top K beams. The top K beams in descending order of RSRP may be top K beams in descending order of RSRP in the first cell, or may be all beams whose RSRP is higher than the preset threshold in the first cell, or may be top K beams selected from M beams whose RSRP is higher than the preset threshold in descending order of RSRP. The top L beams in ascending order of TOA may be top L beams in ascending order of TOA in the first cell, or may be top L beams selected from M beams whose RSRP is higher than the preset threshold in the first cell in ascending order of RSRP.

The top L beams selected based on the RSRP and the top K beams selected based on the TOA may include a same beam. In this case, a measurement result of only one beam is actually reported during measurement result reporting. Therefore, N<L+K. In other words, in a case in which the N beams are the top L beams and the top K beams, when the top L beams and the top K beams do not include a same beam, N=L+K; or when the top L beams and the top K beams include a same beam, N is the actual number of beams. In this way, repeated reporting of beam measurement results can be avoided, and overheads of beam measurement result reporting can be reduced.

For example, the top L beams in ascending order of TOA include beam A, beam B, and beam C, and the top K beams in descending order of RSRP include beam B, beam D, beam E, and beam F. In this case, the number of beams actually reported is 6, that is, N=6.

Specifically, when the measurement result of the beam group is reported, report content may be set based on an actual requirement. For example, in this embodiment, the report content may include at least one of a beam identifier (beam ID), a cell identity (cell ID), a positioning reference signal identifier (PRS ID), a reference time difference, an additional path, reference quality, a reference signal time difference, reference signal time difference quality (RSTD quality), RSRP, reference signal received power quality (RSRP quality), and a port.

In this embodiment of this disclosure, during reporting of positioning measurement information, RSRP or TOA may be used to determine measurement results of N beams for reporting, so that reporting of positioning measurement information is implemented when PRSs of multiple beams are received. Because the beam measurement results to be reported may be properly selected based on the RSRP and the TOA, overheads for reporting the positioning measurement information can be reduced.

Further, the measurement result of the beam group includes a first measurement result and/or a second measurement result, where the first measurement result is a measurement result associated with a downlink time difference of arrival (DL-TDOA), and the second measurement result is a measurement result associated with a downlink angle of departure (DL-AoD).

It should be noted that for measurement results of beams, the terminal may report all or a part of the measurement results. For example, in an optional embodiment, the first configuration information may alternatively be used to indicate the terminal to report the first measurement result or the second measurement result.

Specifically, the network device can configure the DL-TDOA technology and the DL-AoD technology separately. For example, when the network device configures the DL-TDOA technology, the terminal only reports a measurement result associated with the DL-TDOA technology. For example, the measurement result may include at least one of an RSTD, RSTD quality, an additional path, reference quality, RSRP, and RSRP quality. When the network device configures the DL-AoD technology, the terminal only reports a measurement result associated with the DL-AoD technology. For example, the measurement result may include at least one of RSRP and RSRP quality.

In another optional embodiment, the network device may not configure the DL-TDOA technology and the DL-AoD technology separately. In this case, in an implementation solution, the terminal may report all measurement results of beams regardless of the technology. In another implementation solution, the measurement result associated with the DL-TDOA technology or the measurement result associated with the DL-AoD technology may be reported based on report content configured by the network device. Configuration information corresponding to the report content may be carried in a positioning assistance data signaling field of a higher layer protocol (such as LPP), or carried in positioning information request signaling.

Generally, the cells participating in positioning usually include at least three cells. Specifically, the cells participating in positioning include a reference cell and a neighboring cell; or the cells participating in positioning include a neighboring cell. The cells participating in positioning may be configured by the network device. The cell herein may not be limited to a physical cell, but may also be a virtual cell, such as a TP or a TRP. The reference cell may be an RSTD reference cell (the cell is used as a reference for calculating an RSTD), or may be an RSRP reference cell (the cell is used as a reference for calculating relative RSRP values of other cells and other beams). The neighboring cell is a cell participating in positioning other than the reference cell. In this embodiment, the RSTD reference cell and the RSRP reference cell may be a same cell or different cells.

It should be noted that during RSTD and RSRP calculation, it is usually necessary to perform calculation based on the reference beam reference beam. For different values of N, the following describes in detail a definition of a corresponding reference beam.

In an optional embodiment, when N is equal to 1, a beam in a beam group of the reference cell is a reference beam.

In another optional embodiment, when N is greater than 1, the method further includes:

receiving second configuration information from the network device, where the second configuration information is used to configure a reference beam, and the reference beam is a beam in a beam group of the reference cell.

The reference beam is used as a reference for calculating timing of a first beam; or the reference beam is used as a reference for calculating RSRP of a first beam; or the reference beam is used as a reference for calculating timing and RSRP of a first beam. The first beam is a beam in the beam group of the reference cell or a beam in a beam group of the neighboring cell, and the first beam is different from the reference beam.

In this embodiment, when N is equal to 1, the terminal reports measurement information based on only a beam of the reference cell, where the beam may be considered as a reference beam. When N is greater than 1, the network device defines a reference beam for the terminal. In this way, it is convenient for the terminal to report timing and/or RSRP information of other beams in the reference cell or neighboring cell based on the timing and/or RSRP value of the reference beam. Specifically, the terminal may determine a beam as the reference beam based on an instruction of the network device; or the terminal may directly obtain information of the reference beam based on a network-side configuration.

For example, when N is greater than 1, the reference beam is any one of the following beams:
   a beam with a largest RSRP;
   a beam with a smallest TOA; and
   a designated second beam, where the second beam is different from the beam with the largest RSRP, and the second beam is different from the beam with the smallest TOA.

In other words, the reference beam may be a beam among multiple beams in the reference cell. The beam may be the beam with the largest RSRP, the beam with the smallest TOA, or one of other designated beams.

Further, a manner of reporting the measurement result of the beam group may be set based on an actual requirement. For example, in this embodiment, when N is greater than 1, the reporting a measurement result of a beam group may include either of the following manners:
   manner 1: reporting a measurement result of each beam in the beam group; or
   manner 2: reporting a joint measurement result of the beam group, where the joint measurement result is a measurement result obtained after joint processing is performed on measurement results of beams in the beam group.

In the foregoing manner 1, the reporting a measurement result of each beam in the beam group may include:
   reporting measurement results of the reference beam and a third beam based on first preset content, where the third beam is a beam in the beam group of the neighboring cell; and
   reporting a measurement result of a fourth beam based on second preset content, where the fourth beam is a beam other than the reference beam in the beam group of the reference beam, where
   the first preset content includes at least one of a beam identifier, a cell identity, a positioning reference signal identifier, an additional path, reference quality, a reference signal time difference, reference signal time difference quality, RSRP, reference signal received power quality, and a port; and
   the second preset content includes at least one of a reference time difference, a beam ID, a cell ID, a PRS ID, an additional path, reference quality, RSRP, RSRP quality, and a port.

In the foregoing manner 2, a manner of joint processing includes any one of the following:
   calculating an average value of the measurement results of the beams in the beam group;
   calculating a weighted average value of the measurement results of the beams in the beam group;
   selecting measurement results of top J beams from the beam group in descending order of measurement quality;
   selecting measurement results of top J beams from the beam group in descending order of measurement result values; and
   selecting measurement results of top J beams from the beam group in ascending order of measurement result values, where
   J is a positive integer less than N.

For example, in a specific implementation solution, firstly, the terminal obtains TOA information of multiple beams in the reference cell through measurement. Based on an instruction of the network side, the terminal directly performs one of the following processing on TOA information of N beams:
   1. calculating an average value of TOA measurement results of the N beams;
   2. calculating a weighted average value of the TOA of the N beams, where a weighting coefficient may be related to measurement quality;
   3. selecting TOA of one or several beams with best measurement quality to determine the reference beam; and
   4. selecting TOA of one or several beams with a smallest value in the measurement results to determine the reference beam.

Secondly, the terminal obtains TOA information of N beams of the neighboring cell through measurement. Based on an instruction of the network device, the terminal directly performs one of the following processing on TOA information of multiple beams of the neighboring cell:
   1. calculating an average value of TOA measurement results of the N beams to calculate an RSTD;
   2. calculating a weighted average value of TOA of the N beams to calculate an RSTD;
   3. selecting TOA of one or several beams with best measurement quality to calculate an RSTD based on the reference beam; and
   4. selecting TOA of one or several beams with a smallest value in the measurement results to calculate an RSTD based on the reference beam.

Finally, the terminal reports RSTD information, and information such as a cell ID, a beam ID, a PRS ID, and a port that are associated.

After joint processing is performed on the measurement result of the beam group in this embodiment of this disclosure, a joint processing result is reported. In this way, a size and complexity of information reported by the terminal can be reduced, and processing complexity of the network device can also be reduced.

For better understanding this disclosure, the following describes in detail a terminal reporting process corresponding to different values of N.

Solution 1: UE performs reporting based on one PRS beam, where the one PRS beam may be a beam with a largest RSRP or a beam corresponding to smallest TOA.

(1) Report measurement information of a reference cell:
The UE performs reporting based on a beam of the reference cell, where report content may include at least one of a beam ID, a cell ID, a PRS ID, an additional path, reference quality, RSRP, RSRP quality, port information, and the like. Because the UE performs reporting based on only one beam, the beam may be used as a reference beam.

The beam ID is an ID of the beam, and is related to a PRS resource ID of a positioning reference signal resource.

The cell ID may be any one of a physical cell identity (Physical-layer Cell Identity, PCI), a global cell identity global cell ID, and a target object, where the target object may be a TP ID or a TRP ID.

The PRS ID is an ID configured by a network side for the PRS.

The port information indicates to which PRS port a current measurement result belongs.

The reference quality includes TOA detection quality of a channel corresponding to the beam, to facilitate precise positioning by the network side.

The additional path includes timing information of one or more additional paths, relative to path timing for determining an RSTD in the beam, to facilitate more precise positioning by the network side.

RSRP is reference signal received power of the beam.

RSRP quality is estimated RSRP quality of the beam.

(2) Report related measurement information of a neighboring cell:

The UE performs reporting based on a PRS beam of the neighboring cell, where report content may include at least one of a beam ID, a cell ID, a PRS ID, an RSTD, RSTD quality, an additional path, RSRP, RSRP quality, port information, and the like.

The RSTD is a reference time difference of the beam, calculated based on the reference beam of the reference cell.

The RSRP is an RSRP value of the beam relative to the reference beam.

Solution 2: UE performs reporting based on two PRS beams, where the two PRS beams may be a beam with a largest RSRP and a beam corresponding to smallest TOA.

(1) Reporting measurement information of a reference cell includes reporting information of a reference beam and information of another beam in the reference cell.

The reporting information of a reference beam includes reporting at least one of a beam ID, a cell ID, a PRS ID, reference quality, an additional path, RSRP, RSRP quality, port information, and the like.

The reference beam is one of two beams in the reference cell Timing of the other beam in the reference cell or a neighboring cell may use TOA of the reference beam as a reference; and RSRP of the other beam in the reference cell or the neighboring cell may use RSRP of the reference beam as a reference. The reference beam may be a beam with a largest RSRP or a beam with a smallest TOA.

The reported information of the other beam in the reference cell includes at least one of a reference time difference, a beam ID, a cell ID, a PRS ID, reference quality, an additional path, RSRP, RSRP quality, port information, and the like.

The reference time difference is a time difference between TOA of the beam and TOA of the reference beam.

(2) Report related measurement information of a neighboring cell:

The UE reports information based on two beams in the neighboring cell, where information reported per beam per beam includes at least one of a beam ID, a cell ID, a PRS ID, an RSTD, RSTD quality, an additional path, RSRP, RSRP quality, port information, and the like.

Solution 3: N is greater than or equal to 2, and the UE performs reporting based on N PRS beams. The N PRS beams may be beams determined by any one of the following:

top N beams in descending order of reference signal received power RSRP in a first cell;

all beams whose RSRP is higher than a preset threshold in the first cell;

top N beams selected from M beams in descending order of RSRP, where the M beams are beams whose RSRP is higher than the preset threshold in the first cell, and M is an integer greater than N;

top N beams in ascending order of TOA in the first cell;

top N beams selected from M beams in ascending order of TOA, where the M beams are beams whose RSRP is higher than a preset threshold in the first cell; and top L beams in ascending order of time of arrival TOA and top K beams in descending order of RSRP in the first cell, where N≤L+K.

(1) Reporting measurement information of a reference cell includes reporting information of a reference beam and information of another beam in the reference cell.

The reported information of the reference beam includes at least one of a beam ID, a cell ID, a PRS ID, reference quality, an additional path, RSRP, RSRP quality, port information, and the like.

The reference beam is one of N beams in the reference cell Timing of the other beams in the reference cell or a neighboring cell may use TOA of the reference beam as a reference; and RSRP of the other beams in the reference cell or the neighboring cell may use RSRP of the reference beam as a reference. The reference beam may be a beam with a largest RSRP or a beam with a smallest TOA.

Information reported per beam of the other beams in the reference cell includes at least one of a reference time difference, a beam ID, a cell ID, a PRS ID, reference quality, an additional path, RSRP, RSRP quality, port information, and the like.

(2) Report related measurement information of a neighboring cell:

The UE reports information based on N strongest beams in the neighboring cell, where information reported per beam per beam includes at least one of a beam ID, a cell ID, a PRS ID, an RSTD, RSTD quality, an additional path, RSRP, RSRP quality, port information, and the like.

Figure 3:
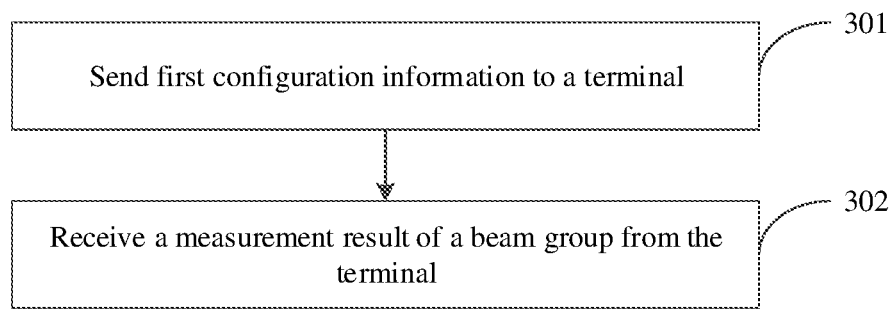
FIG. 3 is a flowchart of another method for reporting positioning measurement information according to an embodiment of this disclosure.

FIG. 3 is a flowchart of another method for reporting positioning measurement information according to an embodiment of this disclosure. The method is applied to a network device. As shown in FIG. 3, the method includes the following steps.

Step 301: Send first configuration information to a terminal.

Step 302: Receive a measurement result of a beam group from the terminal.

The beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

Optionally, the N beams includes any one of the following:

top N beams in descending order of reference signal received power RSRP in the first cell, where the first cell is a cell participating in positioning;

all beams whose RSRP is higher than a preset threshold in the first cell;

top N beams selected from M beams in descending order of RSRP, where the M beams are beams whose RSRP is higher than the preset threshold in the first cell, and M is an integer greater than N;

top N beams in ascending order of TOA in the first cell;
top N beams selected from M beams in ascending order of TOA, where the M beams are beams whose RSRP is higher than a preset threshold in the first cell; and
top L beams in ascending order of TOA and top K beams in descending order of RSRP in the first cell, where N≤L+K.

Optionally, in a case in which the N beams are the top L beams and the top K beams,
when the top L beams and the top K beams do not include a same beam, N=L+K; or
when the top L beams and the top K beams include a same beam, N is the actual number of beams.

Optionally, the measurement result of the beam group includes a first measurement result and/or a second measurement result, where the first measurement result is a measurement result associated with a downlink time difference of arrival DL-TDOA, and the second measurement result is a measurement result associated with a downlink angle of departure DL-AoD.

Optionally, the first configuration information is used to indicate the terminal to report the first measurement result or the second measurement result.

Optionally, the cells participating in positioning include a reference cell and a neighboring cell; or the cells participating in positioning include a neighboring cell.

Optionally, when N is equal to 1, a beam in a beam group of the reference cell is a reference beam.

Optionally, when N is greater than 1, the method further includes:
sending second configuration information to the terminal, where the second configuration information is used to configure a reference beam, and the reference beam is a beam in a beam group of the reference cell, where
the reference beam is used as a reference for calculating timing and/or RSRP of a first beam, the first beam is a beam in the beam group of the reference cell or a beam in a beam group of the neighboring cell, and the first beam is different from the reference beam.

Optionally, when N is greater than 1, the reference beam is any one of the following beams:
a beam with a largest RSRP;
a beam with a smallest TOA; and
a designated second beam, where the second beam is different from the beam with the largest RSRP, and the second beam is different from the beam with the smallest TOA.

Optionally, when N is greater than 1, the receiving a measurement result of a beam group from the terminal includes:
receiving a measurement result of each beam in the beam group from the terminal; or
receiving a joint measurement result of the beam group from the terminal, where the joint measurement result is a measurement result obtained after joint processing is performed on measurement results of beams in the beam group.

Optionally, the terminal reports the measurement result of each beam in the beam group in any one of the following manners:
reporting measurement results of the reference beam and a third beam based on first preset content, where the third beam is a beam in the beam group of the neighboring cell; and
reporting a measurement result of a fourth beam based on second preset content, where the fourth beam is a beam other than the reference beam in the beam group of the reference beam, where
the first preset content includes at least one of a beam identifier beam ID, a cell identity cell ID, a positioning reference signal identifier PRS ID, an additional path additional path, reference quality reference quality, a reference signal time difference RSTD, reference signal time difference quality RSTD quality, RSRP, reference signal received power quality RSRP quality, and a port; and
the second preset content includes at least one of a reference time difference reference time difference, a beam ID, a cell ID, a PRS ID, an additional path, reference quality, RSRP, RSRP quality, and a port.

Optionally, a manner of joint processing includes any one of the following:
calculating an average value of the measurement results of the beams in the beam group;
calculating a weighted average value of the measurement results of the beams in the beam group;
selecting measurement results of top J beams from the beam group in descending order of measurement quality;
selecting measurement results of top J beams from the beam group in descending order of measurement result values; and
selecting measurement results of top J beams from the beam group in ascending order of measurement result values, where
J is a positive integer less than N.

It should be noted that this embodiment is used as an implementation of the network device corresponding to the embodiment shown in FIG. 2. For a specific implementation of this embodiment, reference may be made to the related descriptions of the embodiment shown in FIG. 2, and a same beneficial effect is achieved. To avoid repetition, details are not described herein again.

Figure 4:
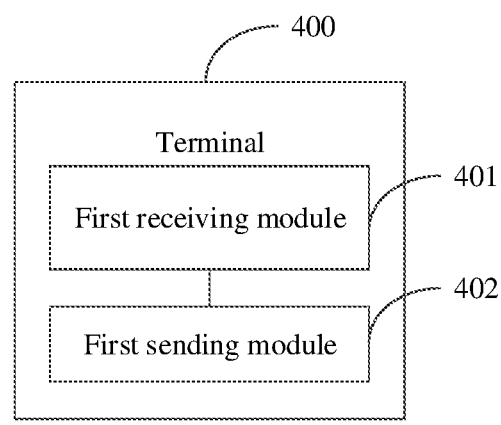
FIG. 4 is a structural diagram of a terminal according to an embodiment of this disclosure.

FIG. 4 is a structural diagram of a terminal according to an embodiment of this disclosure. As shown in FIG. 4, the terminal 400 includes:
a first receiving module 401, configured to receive first configuration information from a network device; and
a first sending module 402, configured to report a measurement result of a beam group based on the first configuration information, where
the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

Optionally, the N beams includes any one of the following:
top N beams in descending order of reference signal received power RSRP in the first cell;
all beams whose RSRP is higher than a preset threshold in the first cell;
top N beams selected from M beams in descending order of RSRP, where the M beams are beams whose RSRP is higher than the preset threshold in the first cell, and M is an integer greater than N;
top N beams in ascending order of TOA in the first cell;
top N beams selected from M beams in ascending order of TOA, where the M beams are beams whose RSRP is higher than a preset threshold in the first cell; and top L beams in ascending order of TOA and top K beams in descending order of RSRP in the first cell, where N≤L+K.

Optionally, in a case in which the N beams are the top L beams and the top K beams,
when the top L beams and the top K beams do not include a same beam, N=L+K; or
when the top L beams and the top K beams include a same beam, N is the actual number of beams.

Optionally, the measurement result of the beam group includes a first measurement result and/or a second measurement result, where the first measurement result is a measurement result associated with a downlink time difference of arrival DL-TDOA, and the second measurement result is a measurement result associated with a downlink angle of departure DL-AoD.

Optionally, the first configuration information is used to indicate the terminal to report the first measurement result or the second measurement result.

Optionally, the cells participating in positioning include a reference cell and a neighboring cell; or the cells participating in positioning include a neighboring cell.

Optionally, when N is equal to 1, a beam in a beam group of the reference cell is a reference beam.

Optionally, when N is greater than 1, the first receiving module is further configured to:
receive second configuration information from the network device, where the second configuration information is used to configure a reference beam, and the reference beam is a beam in a beam group of the reference cell, where
the reference beam is used as a reference for calculating timing and/or RSRP of a first beam, the first beam is a beam in the beam group of the reference cell or a beam in a beam group of the neighboring cell, and the first beam is different from the reference beam.

Optionally, when N is greater than 1, the reference beam is any one of the following beams:
a beam with a largest RSRP;
a beam with a smallest TOA; and
a designated second beam, where the second beam is different from the beam with the largest RSRP, and the second beam is different from the beam with the smallest TOA.

Optionally, when N is greater than 1, the reporting a measurement result of a beam group includes:
reporting a measurement result of each beam in the beam group; or
reporting a joint measurement result of the beam group, where the joint measurement result is a measurement result obtained after joint processing is performed on measurement results of beams in the beam group.

Optionally, the first sending module 402 is specifically configured to: report measurement results of the reference beam and a third beam based on first preset content, where the third beam is a beam in the beam group of the neighboring cell; and report a measurement result of a fourth beam based on second preset content, where the fourth beam is a beam other than the reference beam in the beam group of the reference beam, where
the first preset content includes at least one of a beam identifier beam ID, a cell identity cell ID, a positioning reference signal identifier PRS ID, an additional path additional path, reference quality reference quality, a reference signal time difference RSTD, reference signal time difference quality RSTD quality, RSRP, reference signal received power quality RSRP quality, and a port; and
the second preset content includes at least one of a reference time difference reference time difference, a beam ID, a cell ID, a PRS ID, an additional path, reference quality, RSRP, RSRP quality, and a port.

Optionally, a manner of joint processing includes any one of the following:
calculating an average value of the measurement results of the beams in the beam group;
calculating a weighted average value of the measurement results of the beams in the beam group;
selecting measurement results of top J beams from the beam group in descending order of measurement quality;
selecting measurement results of top J beams from the beam group in descending order of measurement result values; and
selecting measurement results of top J beams from the beam group in ascending order of measurement result values, where
J is a positive integer less than N.

The terminal provided in this embodiment of this disclosure can implement each process implemented by the terminal in the method embodiment in FIG. 2. To avoid repetition, details are not described herein again.

Figure 5:
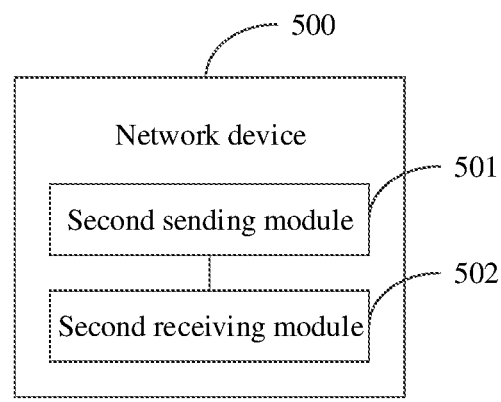
FIG. 5 is a structural diagram of a network device according to an embodiment of this disclosure.

FIG. 5 is a structural diagram of a network device according to an embodiment of this disclosure. As shown in FIG. 5, the network device 500 includes:
a second sending module 501, configured to send first configuration information to a terminal; and
a second receiving module 502, configured to receive a measurement result of a beam group from the terminal, where
the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

Optionally, the N beams includes any one of the following:
top N beams in descending order of reference signal received power RSRP in the first cell, where the first cell is a cell participating in positioning;
all beams whose RSRP is higher than a preset threshold in the first cell;
top N beams selected from M beams in descending order of RSRP, where the M beams are beams whose RSRP is higher than the preset threshold in the first cell, and M is an integer greater than N;
top N beams in ascending order of TOA in the first cell;
top N beams selected from M beams in ascending order of TOA, where the M beams are beams whose RSRP is higher than a preset threshold in the first cell; and
top L beams in ascending order of TOA and top K beams in descending order of RSRP in the first cell, where N≤L+K.

Optionally, in a case in which the N beams are the top L beams and the top K beams,
when the top L beams and the top K beams do not include a same beam, N=L+K; or
when the top L beams and the top K beams include a same beam, N is the actual number of beams.

Optionally, the measurement result of the beam group includes a first measurement result and/or a second measurement result, where the first measurement result is a measurement result associated with a downlink time difference of arrival DL-TDOA, and the second measurement result is a measurement result associated with a downlink angle of departure DL-AoD.

Optionally, the first configuration information is used to indicate the terminal to report the first measurement result or the second measurement result.

Optionally, the cells participating in positioning include a reference cell and a neighboring cell; or the cells participating in positioning include a neighboring cell.

Optionally, when N is equal to 1, a beam in a beam group of the reference cell is a reference beam.

Optionally, when N is greater than 1, the second sending module 501 is further configured to:
  send second configuration information to the terminal, where the second configuration information is used to configure a reference beam, and the reference beam is a beam in a beam group of the reference cell, where the reference beam is used as a reference for calculating timing and/or RSRP of a first beam, the first beam is a beam in the beam group of the reference cell or a beam in a beam group of the neighboring cell, and the first beam is different from the reference beam.

Optionally, when N is greater than 1, the reference beam is any one of the following beams:
  a beam with a largest RSRP;
  a beam with a smallest TOA; and
  a designated second beam, where the second beam is different from the beam with the largest RSRP, and the second beam is different from the beam with the smallest TOA.

Optionally, when N is greater than 1, the receiving a measurement result of a beam group from the terminal includes:
  receiving a measurement result of each beam in the beam group from the terminal; or
  receiving a joint measurement result of the beam group from the terminal, where the joint measurement result is a measurement result obtained after joint processing is performed on measurement results of beams in the beam group.

Optionally, the terminal reports the measurement result of each beam in the beam group in any one of the following manners:
  reporting measurement results of the reference beam and a third beam based on first preset content, where the third beam is a beam in the beam group of the neighboring cell; and
  reporting a measurement result of a fourth beam based on second preset content, where the fourth beam is a beam other than the reference beam in the beam group of the reference beam, where
  the first preset content includes at least one of a beam identifier beam ID, a cell identity cell ID, a positioning reference signal identifier PRS ID, an additional path additional path, reference quality reference quality, a reference signal time difference RSTD, reference signal time difference quality RSTD quality, RSRP, reference signal received power quality RSRP quality, and a port; and
  the second preset content includes at least one of a reference time difference reference time difference, a beam ID, a cell ID, a PRS ID, an additional path, reference quality, RSRP, RSRP quality, and a port.

Optionally, a manner of joint processing includes any one of the following:
  calculating an average value of the measurement results of the beams in the beam group;
  calculating a weighted average value of the measurement results of the beams in the beam group;
  selecting measurement results of top J beams from the beam group in descending order of measurement quality;
  selecting measurement results of top J beams from the beam group in descending order of measurement result values; and
  selecting measurement results of top J beams from the beam group in ascending order of measurement result values, where
  J is a positive integer less than N.

The network device provided in this embodiment of this disclosure can implement each process implemented by the network device in the method embodiment in FIG. 3. To avoid repetition, details are not described herein again.

Figure 6:
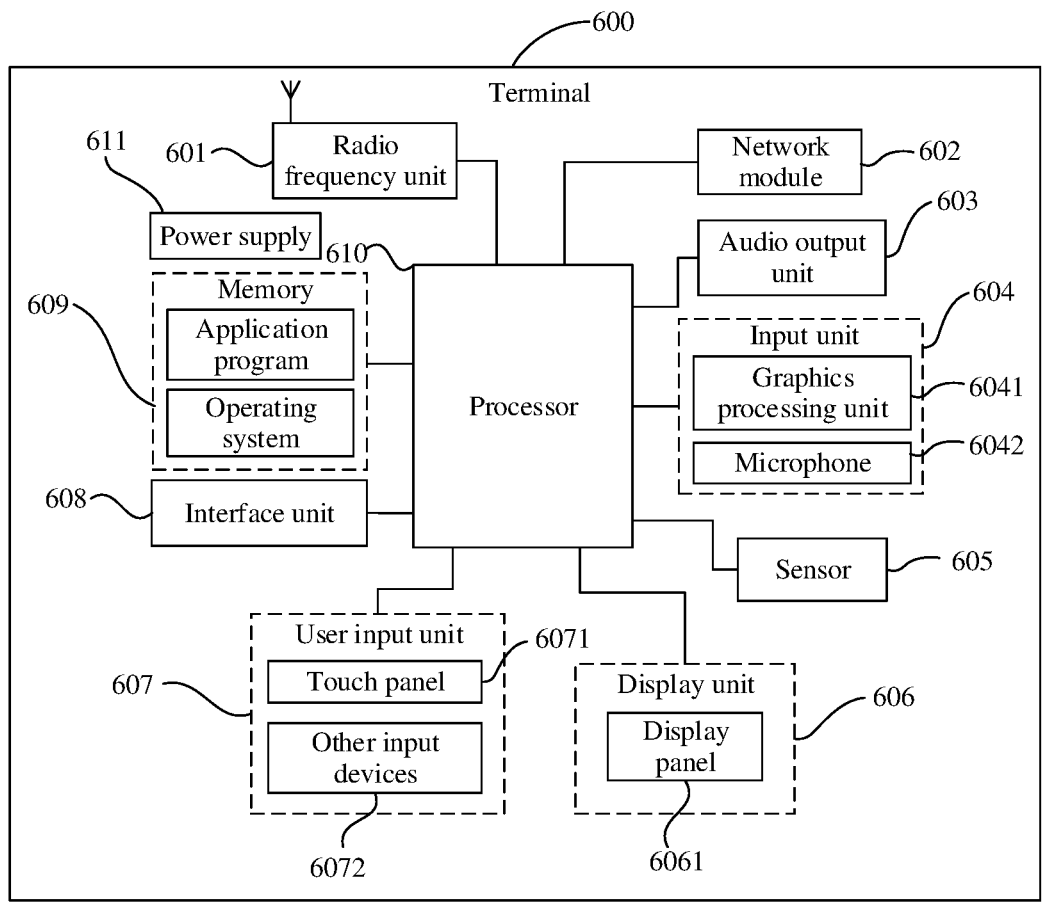
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 601 is configured to receive first configuration information from a network device; and report a measurement result of a beam group based on the first configuration information, where
  the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

Optionally, the N beams includes any one of the following:
  top N beams in descending order of reference signal received power RSRP in the first cell;
  all beams whose RSRP is higher than a preset threshold in the first cell;
  top N beams selected from M beams in descending order of RSRP, where the M beams are beams whose RSRP is higher than the preset threshold in the first cell, and M is an integer greater than N;
  top N beams in ascending order of TOA in the first cell;
  top N beams selected from M beams in ascending order of TOA, where the M beams are beams whose RSRP is higher than a preset threshold in the first cell; and
  top L beams in ascending order of TOA and top K beams in descending order of RSRP in the first cell, where N≤L+K.

Optionally, in a case in which the N beams are the top L beams and the top K beams,
  when the top L beams and the top K beams do not include a same beam, N=L+K; or when the top L beams and the top K beams include a same beam, N is the actual number of beams.

Optionally, the measurement result of the beam group includes a first measurement result and/or a second measurement result, where the first measurement result is a measurement result associated with a downlink time difference of arrival DL-TDOA, and the second measurement result is a measurement result associated with a downlink angle of departure DL-AoD.

Optionally, the first configuration information is used to indicate the terminal to report the first measurement result or the second measurement result.

Optionally, the cells participating in positioning include a reference cell and a neighboring cell; or the cells participating in positioning include a neighboring cell.

Optionally, when N is equal to 1, a beam in a beam group of the reference cell is a reference beam.

Optionally, when N is greater than 1, the radio frequency unit 601 is further configured to:
receive second configuration information from the network device, where the second configuration information is used to configure a reference beam, and the reference beam is a beam in a beam group of the reference cell, where
the reference beam is used as a reference for calculating timing and/or RSRP of a first beam, the first beam is a beam in the beam group of the reference cell or a beam in a beam group of the neighboring cell, and the first beam is different from the reference beam.

Optionally, when N is greater than 1, the reference beam is any one of the following beams:
a beam with a largest RSRP;
a beam with a smallest TOA; and
a designated second beam, where the second beam is different from the beam with the largest RSRP, and the second beam is different from the beam with the smallest TOA.

Optionally, when N is greater than 1, the reporting a measurement result of a beam group includes:
reporting a measurement result of each beam in the beam group; or
reporting a joint measurement result of the beam group, where the joint measurement result is a measurement result obtained after joint processing is performed on measurement results of beams in the beam group.

Optionally, the radio frequency unit 601 is specifically configured to: report measurement results of the reference beam and a third beam based on first preset content, where the third beam is a beam in the beam group of the neighboring cell; and report a measurement result of a fourth beam based on second preset content, where the fourth beam is a beam other than the reference beam in the beam group of the reference beam, where
the first preset content includes at least one of a beam identifier beam ID, a cell identity cell ID, a positioning reference signal identifier PRS ID, an additional path additional path, reference quality reference quality, a reference signal time difference RSTD, reference signal time difference quality RSTD quality, RSRP, reference signal received power quality RSRP quality, and a port; and
the second preset content includes at least one of a reference time difference reference time difference, a beam ID, a cell ID, a PRS ID, an additional path, reference quality, RSRP, RSRP quality, and a port.

Optionally, a manner of joint processing includes any one of the following:
calculating an average value of the measurement results of the beams in the beam group;
calculating a weighted average value of the measurement results of the beams in the beam group;
selecting measurement results of top J beams from the beam group in descending order of measurement quality;
selecting measurement results of top J beams from the beam group in descending order of measurement result values; and
selecting measurement results of top J beams from the beam group in ascending order of measurement result values, where
J is a positive integer less than N.

In this embodiment of this disclosure, during reporting of positioning measurement information, RSRP or TOA may be used to determine measurement results of N beams for reporting, so that reporting of positioning measurement information is implemented when PRSs of multiple beams are received. Because the beam measurement results to be reported may be properly selected based on the RSRP and the TOA, overheads for reporting the positioning measurement information can be reduced.

It should be understood that in this embodiment of this disclosure, the radio frequency unit 601 may be configured to: receive and transmit signals in an information receiving/transmitting process or a call process; and specifically, after receiving downlink data from a base station, transmit the downlink data to the processor 610 for processing, and in addition, transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides wireless broadband Internet access for a user by using the network module 602, for example, helps the user send and receive e-mails, browse web pages, and access streaming media.

The audio output unit 603 may convert audio data received by the radio frequency unit 601 or the network module 602 or stored in the memory 609 into an audio signal, and output the audio signal as a sound. In addition, the audio output unit 603 may further provide an audio output (for example, a call signal received sound or a message received sound) related to a specific function performed by the terminal 600. The audio output unit 603 includes a speaker, a buzzer, a phone receiver, and the like.

The input unit 604 is configured to receive an audio or video signal. The input unit 604 may include a graphics processing unit (GPU) 6041 and a microphone 6042. The graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted in a telephone call mode into a format that can be sent to a mobile communications base station through the radio frequency unit 601, for outputting.

The terminal 600 further includes at least one sensor 605, for example, an optical sensor, a motion sensor, and another sensor. Specifically, the optical sensor includes an ambient light sensor and a proximity sensor. The ambient light sensor may adjust luminance of a display panel 6061 based on brightness of ambient light. The proximity sensor may turn off the display panel 6061 and/or backlight when the terminal 600 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be configured to receive input digit or character information, and generate a key signal input related to a user setting and function control of the terminal. Specifically, the user input unit 607 includes a touch panel 6071 and other input devices 6072. The touch panel 6071, also referred to as a touchscreen, may capture a touch operation performed by the user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 610, and receives and executes a command sent by the processor 610. In addition, the touch panel 6071 may be implemented in a plurality of forms, for example, a resistive, capacitive, infrared, or surface acoustic wave touch panel. The user input unit 607 may further include the other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After the touch panel 6071 detects a touch operation on or near the touch panel, the touch panel 6071 transmits the touch operation to the processor 610 to determine a type of a touch event. Then the processor 610 provides a corresponding visual output on the display panel 6061 based on the type of the touch event. Although the touch panel 6071 and the display panel 6061 are used as two independent components to implement input and output functions of the terminal in FIG. 6, the touch panel 6071 and the display panel 6061 may be integrated to implement the input and output functions of the terminal in some embodiments. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 608 may be configured to receive an input (for example, data information or power) from an external apparatus, and transmit the received input to one or more components in the terminal 600, or may be configured to transmit data between the terminal 600 and an external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory, or other volatile solid-state storage devices.

The processor 610 is a control center of the terminal. The processor 610 uses various interfaces and lines to connect all parts of the entire terminal, and performs various functions and data processing of the terminal by running or executing the software program and/or module stored in the memory 609 and invoking data stored in the memory 609, thereby performing overall monitoring on the terminal. The processor 610 may include one or more processing units. Optionally, the processor 610 may integrate an application processor and a modem processor. The application processor mainly processes the operating system, a user interface, an application program, and the like. The modem processor mainly processes wireless communication. It may be understood that the modem processor may alternatively not be integrated into the processor 610.

The terminal 600 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 600 includes some functional modules that are not illustrated. Details are not described herein.

Optionally, an embodiment of this disclosure further provides a terminal, including a processor 610, a memory 609, and a computer program stored in the memory 609 and running on the processor 610. When the computer program is executed by the processor 610, the processes of the foregoing embodiment of the foregoing positioning measurement information reporting method embodiment is implemented, with a same technical effect achieved. To avoid repetition, details are not described herein again.

Figure 7:
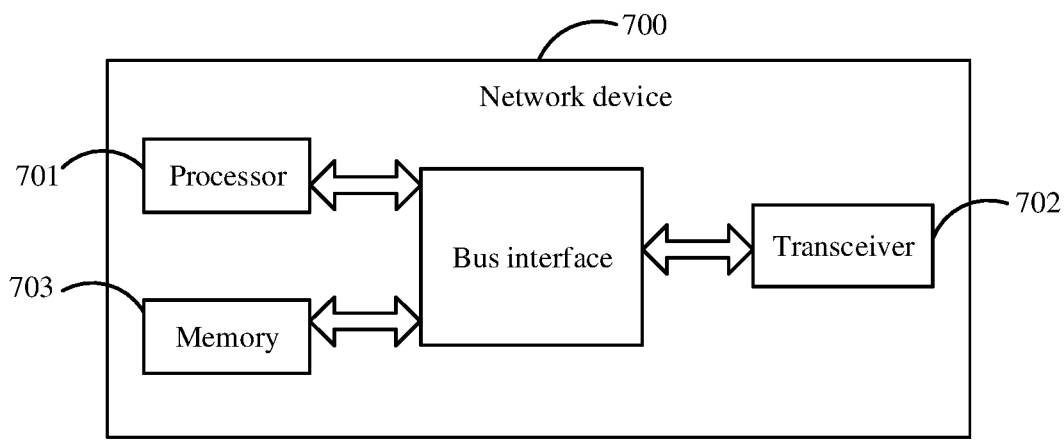
FIG. 7 is a structural diagram of another network device according to an embodiment of this disclosure.

FIG. 7 is a structural diagram of another network device according to an embodiment of this disclosure. As shown in FIG. 7, the network device 700 includes a processor 701, a transceiver 702, a memory 703, and a bus interface.

The transceiver 702 is configured to send first configuration information to a terminal; and receive a measurement result of a beam group that is reported by the terminal, where the beam group is used to transmit a positioning reference signal PRS, and the beam group includes N beams determined by reference signal received power RSRP or time of arrival TOA, where N is a positive integer, the N beams are beams in a first cell, and the first cell is one of cells participating in positioning.

Optionally, the N beams includes any one of the following:

top N beams in descending order of reference signal received power RSRP in the first cell, where the first cell is a cell participating in positioning;

all beams whose RSRP is higher than a preset threshold in the first cell;

top N beams selected from M beams in descending order of RSRP, where the M beams are beams whose RSRP is higher than the preset threshold in the first cell, and M is an integer greater than N;

top N beams selected from M beams in ascending order of TOA, where the M beams are beams whose RSRP is higher than a preset threshold in the first cell; and top N beams in ascending order of TOA in the first cell;

top L beams in ascending order of TOA and top K beams in descending order of RSRP in the first cell, where N≤L+K.

Optionally, in a case in which the N beams are the top L beams and the top K beams, when the top L beams and the top K beams do not include a same beam, N=L+K; or when the top L beams and the top K beams include a same beam, N is the actual number of beams.

Optionally, the measurement result of the beam group includes a first measurement result and/or a second measurement result, where the first measurement result is a measurement result associated with a downlink time difference of arrival DL-TDOA, and the second measurement result is a measurement result associated with a downlink angle of departure DL-AoD.

Optionally, the first configuration information is used to indicate the terminal to report the first measurement result or the second measurement result.

Optionally, the cells participating in positioning include a reference cell and a neighboring cell; or the cells participating in positioning include a neighboring cell.

Optionally, when N is equal to 1, a beam in a beam group of the reference cell is a reference beam.

Optionally, when N is greater than 1, the transceiver 702 is further configured to:

send second configuration information to the terminal, where the second configuration information is used to configure a reference beam, and the reference beam is a beam in a beam group of the reference cell, where the reference beam is used as a reference for calculating timing and/or RSRP of a first beam, the first beam is a beam in the beam group of the reference cell or a beam in a beam group of the neighboring cell, and the first beam is different from the reference beam.

Optionally, when N is greater than 1, the reference beam is any one of the following beams:

a beam with a largest RSRP;

a beam with a smallest TOA; and a designated second beam, where the second beam is different from the beam with the largest RSRP, and the second beam is different from the beam with the smallest TOA.

Optionally, when N is greater than 1, the receiving a measurement result of a beam group that is reported by the terminal includes:

receiving a measurement result of each beam in the beam group that is reported by the terminal; or receiving a joint measurement result of the beam group that is reported by the terminal, where the joint measurement result is a measurement result obtained after joint processing is performed on measurement results of beams in the beam group.

Optionally, the terminal reports the measurement result of each beam in the beam group in any one of the following manners:

reporting measurement results of the reference beam and a third beam based on first preset content, where the third beam is a beam in the beam group of the neighboring cell; and reporting a measurement result of a fourth beam based on second preset content, where the fourth beam is a beam other than the reference beam in the beam group of the reference beam, where the first preset content includes at least one of a beam identifier beam ID, a cell identity cell ID, a positioning reference signal identifier PRS ID, an additional path additional path, reference quality reference quality, a reference signal time difference RSTD, reference signal time difference quality RSTD quality, RSRP, reference signal received power quality RSRP quality, and a port; and the second preset content includes at least one of a reference time difference reference time difference, a beam ID, a cell ID, a PRS ID, an additional path, reference quality, RSRP, RSRP quality, and a port.

Optionally, a manner of joint processing includes any one of the following:

calculating an average value of the measurement results of the beams in the beam group;

calculating a weighted average value of the measurement results of the beams in the beam group;

selecting measurement results of top J beams from the beam group in descending order of measurement quality;

selecting measurement results of top J beams from the beam group in descending order of measurement result values; and selecting measurement results of top J beams from the beam group in ascending order of measurement result values, where J is a positive integer less than N.

In this embodiment of this disclosure, during reporting of positioning measurement information, RSRP or TOA may be used to determine measurement results of N beams for reporting, so that reporting of positioning measurement information is implemented when PRSs of multiple beams are received. Because the beam measurement results to be reported may be properly selected based on the RSRP and the TOA, overheads for reporting the positioning measurement information can be reduced.

In FIG. 7, a bus architecture may include any quantity of interconnect buses and bridges, specifically for interconnecting various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides an interface. The transceiver 702 may be a plurality of components, that is, the transceiver 702 includes a transmitter and a receiver, and provides a unit for communicating with various other apparatuses on a transmission medium. For different user equipment, a user interface 704 may also be an interface for externally or internally connecting a required device, and the connected device includes but is not limited to a mini keyboard, a display, a speaker, a microphone, a joystick, or the like.

The processor 701 is responsible for bus architecture management and general processing. The memory 703 may store data used when the processor 701 performs an operation.

Optionally, an embodiment of this disclosure further provides a network device, including a processor 701, a memory 703, and a computer program stored in the memory 703 and capable of running on the processor 701. When the computer program is executed by the processor 701, the processes of the foregoing method for reporting positioning measurement information embodiment is implemented, with a same technical effect achieved. To avoid repetition, details are not described herein again.

Some embodiments of this disclosure further provide a computer-readable storage medium. The computer-readable storage medium stores a computer program, and when the computer program is executed by a processor, the processes of the foregoing embodiment of the method for reporting positioning measurement information embodiment on the network device side according to some embodiments of this disclosure can be implemented, or when the computer program is executed by a processor, the processes of the foregoing embodiment of the method for reporting positioning measurement information embodiment on the terminal side according to some embodiments of this disclosure is implemented, with a same technical effect achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection scope of this disclosure.

What is claimed is:

1. A method for reporting positioning measurement information, applied to a terminal and comprising:
receiving first configuration information from a network device;
receiving second configuration information from the network device, wherein the second configuration information is used to configure a reference beam;
calculating a reference signal received power RSRP of one or more first beams according to the reference beam, wherein the one or more first beams are from a beam group and the one or more first beams are different from the reference beam, wherein the beam group is used to transmit a positioning reference signal PRS, and the beam group comprises N beams in cells participating in positioning;
wherein the cells participating in positioning comprise a reference cell and a neighboring cell, the reference beam is a beam in a beam group of the reference cell, and the first beam is a beam in the beam group of the neighboring cell;
reporting a measurement result of the beam group based on the first configuration information, wherein the measurement result at least comprises the RSRP of the one or more first beams.

2. The method according to claim 1, wherein the N beams comprises any one of the following:
top N beams in descending order of reference signal received power RSRP in a first cell, the first cell is a cell participating in positioning;
all beams whose RSRP is higher than a preset threshold in the first cell;
top N beams selected from M beams in descending order of RSRP, wherein the M beams are beams whose RSRP is higher than the preset threshold in the first cell, and M is an integer greater than N;
top N beams in ascending order of TOA in the first cell;
top N beams selected from M beams in ascending order of TOA, wherein the M beams are beams whose RSRP is higher than a preset threshold in the first cell; or, top L beams in ascending order of TOA and top K beams in descending order of RSRP in the first cell, wherein $N \leq L+K$.

3. The method according to claim 2, wherein in a case in which the N beams are the top L beams and the top K beams,
when the top L beams and the top K beams do not comprise a same beam, N=L+K; or
when the top L beams and the top K beams comprise a same beam, N is the actual number of beams.

4. The method according to claim 1, wherein the measurement result of the beam group further comprises a first measurement result and/or a second measurement result, wherein the first measurement result is a measurement result associated with a downlink time difference of arrival DL-TDOA, and the second measurement result is a measurement result associated with a downlink angle of departure DL-AoD.

5. The method according to claim 4, wherein the first configuration information is used to indicate the terminal to report the first measurement result or the second measurement result.

6. The method according to claim 1, wherein the reference beam is any one of the following beams:

a beam with a largest RSRP;
a beam with a smallest TOA; or,
a designated second beam, wherein the second beam is different from the beam with the largest RSRP, and the second beam is different from the beam with the smallest TOA.

7. The method according to claim 1, wherein the reporting a measurement result of a beam group comprises:
reporting a measurement result of each beam in the beam group; or
reporting a joint measurement result of the beam group, wherein the joint measurement result is a measurement result obtained after joint processing is performed on measurement results of beams in the beam group.

8. The method according to claim 7, wherein the reporting a measurement result of each beam in the beam group comprises:
reporting measurement results of the reference beam and a third beam based on first preset content, wherein the third beam is a beam in the beam group of the neighboring cell; and
reporting a measurement result of a fourth beam based on second preset content, wherein the fourth beam is a beam other than the reference beam in the beam group which contains the reference beam, wherein
the first preset content comprises at least one of a beam identifier beam ID, a cell identity cell ID, a positioning reference signal identifier PRS ID, an additional path, reference quality, a reference signal time difference RSTD, reference signal time difference quality RSTD quality, RSRP, reference signal received power quality RSRP quality, or a port; and
the second preset content comprises at least one of a reference time difference reference time difference, a beam ID, a cell ID, a PRS ID, an additional path, reference quality, RSRP, RSRP quality, or a port.

9. The method according to claim 7, wherein a manner of joint processing comprises any one of the following:
calculating an average value of the measurement results of the beams in the beam group;
calculating a weighted average value of the measurement results of the beams in the beam group;
selecting measurement results of top J beams from the beam group in descending order of measurement quality;
selecting measurement results of top J beams from the beam group in descending order of measurement result values; or,
selecting measurement results of top J beams from the beam group in ascending order of measurement result values, wherein
J is a positive integer less than N.

10. A method for reporting positioning measurement information, applied to a network device and comprising:
sending first configuration information to a terminal;
seconding second configuration information to the terminal, wherein the second configuration information is used to configure a reference beam used to calculate a reference signal received power RSRP of one or more first beams, wherein the one or more first beams are from a beam group and the one or more first beams are different from the reference beam, wherein the beam group is used to transmit a positioning reference signal PRS, and the beam group comprises N beams in cells participating in positioning;
wherein the cells participating in positioning comprise a reference cell and a neighboring cell, the reference beam is a beam in a beam group of the reference cell, and the first beam is a beam in the beam group of the neighboring cell;
receiving a measurement result of the beam group from the terminal, wherein the measurement result at least comprises the RSRP of the one or more first beams.

11. The method according to claim 10, wherein the N beams comprises any one of the following:
top N beams in descending order of reference signal received power RSRP in a first cell, wherein the first cell is a cell participating in positioning;
all beams whose RSRP is higher than a preset threshold in the first cell;
top N beams selected from M beams in descending order of RSRP, wherein the M beams are beams whose RSRP is higher than the preset threshold in the first cell, and M is an integer greater than N;
top N beams in ascending order of TOA in the first cell;
top N beams selected from M beams in ascending order of TOA, wherein the M beams are beams whose RSRP is higher than a preset threshold in the first cell; or,
top L beams in ascending order of TOA and top K beams in descending order of RSRP in the first cell, wherein N≤L+K.

12. The method according to claim 11, wherein in a case in which the N beams are the top L beams and the top K beams,
when the top L beams and the top K beams do not comprise a same beam, N=L+K; or
when the top L beams and the top K beams comprise a same beam, N is the actual number of beams.

13. The method according to claim 10, wherein the measurement result of the beam group further comprises a first measurement result and/or a second measurement result, wherein the first measurement result is a measurement result associated with a downlink time difference of arrival DL-TDOA, and the second measurement result is a measurement result associated with a downlink angle of departure DL-AoD.

14. The method according to claim 10, wherein the receiving a measurement result of a beam group from the terminal comprises:
receiving a measurement result of each beam in the beam group from the terminal; or
receiving a joint measurement result of the beam group from the terminal, wherein the joint measurement result is a measurement result obtained after joint processing is performed on measurement results of beams in the beam group;
wherein the terminal reports the measurement result of each beam in the beam group in any one of the following manners:
reporting measurement results of the reference beam and a third beam based on first preset content, wherein the third beam is a beam in the beam group of the neighboring cell; or,
reporting a measurement result of a fourth beam based on second preset content, wherein the fourth beam is a beam other than the reference beam in the beam group of the reference beam, wherein
the first preset content comprises at least one of a beam identifier beam ID, a cell identity cell ID, a positioning reference signal identifier PRS ID, an additional path additional path, reference quality reference quality, a reference signal time difference RSTD, reference signal time difference quality RSTD quality, RSRP, reference signal received power quality RSRP quality, or a port; and the second preset content comprises at least one of a reference time difference reference time difference, a beam ID, a cell ID, a PRS ID, an additional path, reference quality, RSRP, RSRP quality, or a port.

15. A terminal, comprising a memory, a processor, and a program stored in the memory and capable of running on the processor, wherein when the program is executed by the processor, steps of a method for reporting positioning measurement information are implemented, wherein the method for reporting positioning measurement information comprises:

receiving first configuration information from a network device;

receiving second configuration information from the network device, wherein the second configuration information is used to configure a reference beam;

calculating a reference signal received power RSRP of one or more first beams according to the reference beam, wherein the one or more first beams are from a beam group and the one or more first beams are different from the reference beam, wherein the beam group is used to transmit a positioning reference signal PRS, and the beam group comprises N beams in cells participating in positioning;

wherein the cells participating in positioning comprise a reference cell and a neighboring cell, the reference beam is a beam in a beam group of the reference cell, and the first beam is a beam in the beam group of the neighboring cell;

reporting a measurement result of the beam group based on the first configuration information, wherein the measurement result at least comprises the RSRP of the one or more first beams.

16. The terminal according to claim 15, wherein the N beams comprises any one of the following:

top N beams in descending order of reference signal received power RSRP in a first cell, the first cell is a cell participating in positioning;

all beams whose RSRP is higher than a preset threshold in the first cell;

top N beams selected from M beams in descending order of RSRP, wherein the M beams are beams whose RSRP is higher than the preset threshold in the first cell, and M is an integer greater than N;

top N beams in ascending order of TOA in the first cell;

top N beams selected from M beams in ascending order of TOA, wherein the M beams are beams whose RSRP is higher than a preset threshold in the first cell; or, top L beams in ascending order of TOA and top K beams in descending order of RSRP in the first cell, wherein N≤L+K.

17. The terminal according to claim 15, wherein the measurement result of the beam group further comprises a first measurement result and/or a second measurement result, wherein the first measurement result is a measurement result associated with a downlink time difference of arrival DL-TDOA, and the second measurement result is a measurement result associated with a downlink angle of departure DL-AoD.

* * * * *